J. HECK.
Mill Bush.
No. 3,505. Patented March 26, 1844.
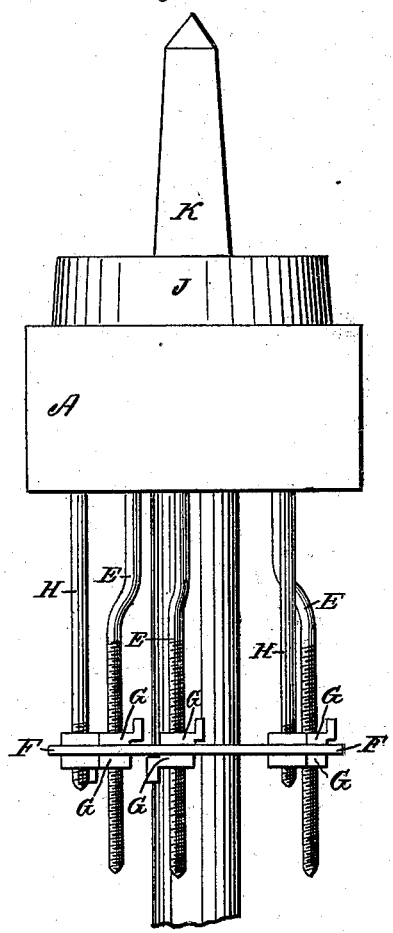
Fig: 1.
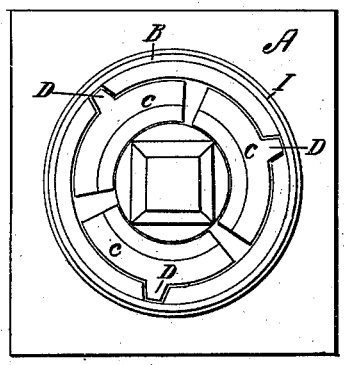
Fig: 2.
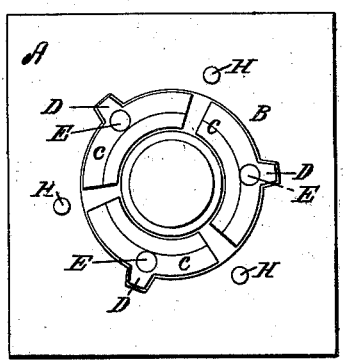
Fig: 3.

UNITED STATES PATENT OFFICE.

JOHN HECK, OF BOONSBORO, MARYLAND.

MILL-BUSH.

Specification of Letters Patent No. 3,505, dated March 26, 1844.

*To all whom it may concern:*

Be it known that I, JOHN HECK, of Boonsboro, Washington county, State of Maryland, have invented a new and Improved Mill-Bush, which is described as follows, reference being had to the annexed drawings of the same, making part of this specification, of which—

Figure 1 is a side elevation. Fig. 2 is a top view. Fig. 3 is a bottom view.

The nature of this invention is to enable the miller to adjust the segment bush to the spindle (in compensating for the wear by use) by screws and nuts applied beneath the bed, in order to reduce friction and the consequent wear of the bush and spindle and to do away with the necessity of raising the runner to gain access to the bush for adjustment as is experienced in the use of the common segment bush that is forced against the spindle by wedge shaped wedges and springs.

In my improved mode of adjusting the segment bush to the spindle I make use of a cast iron box A in which there is an aperture B in the center shaped like an inverted hollow frustrum of a cone with vertical grooves in which aperture the segment bush C of a corresponding shape is arranged, there being on the outer periphery of said bush tongues D or projections which enter the corresponding vertical grooves in the said box.

Into the lower or small end of each segment of the bush is inserted a rod E with a screw cut thereon which extends down through the bed stone and passes through a stationary frame F said screw rods having each two nuts G thereon one placed above the said frame and one below it, the upper nut to screw down upon the top of the frame, and the under one to screw up against the under side thereof, so that when one of the segments of the bush is required to be lowered for bringing and sustaining its concave surface near to or against the spindle the nuts are turned to the right on the rod. In this manner all the segments of the bush are treated, and when it is required to remove them from the spindle the motion of the nuts is reversed which causes the segments to rise.

The aforesaid permanent frame E may be a circular plate as represented in the drawings or it may be of any suitable form and structure and attached permanently to the box A, or to the bed by vertical hanging screw rods H, and nuts, or other suitable means.

I is a circular rim cast on the upper surface or top of the box forming a receptacle for the oil used to lubricate the spindle.

J is a cover put over said receptacle for keeping out dust or dirt from the bush. This cover is perforated with a square hole through which the cock head is inserted and turns with it.

K is the spindle.

The superiority of this form and arrangement of bush over all others in use will be evident to the millwright particularly in its capability of being adjusted with the utmost nicety to the spindle and sustained in the required position without producing a constant and unequal pressure against the spindle arising from the use of weighted wedges and springs. Also in the convenient arrangement of the adjusting screws and nuts below the bed where access can be easily had to them without the necessity of removing the runner from the bed stone.

What I claim as my invention and desire to secure by Letters Patent is—

The method of adjusting the segment bush to the spindle and sustaining the same in the position required by means of the screw rods and nuts in combination with the stationary frame and box constructed and arranged as above set forth or in any other mode substantially the same wherein analogous results are produced.

JOHN HECK.

Witnesses:
SAMUEL BENTZ,
JACOB SMITH.